July 24, 1962 R. STADELMANN 3,045,525
LOADING AND UNLOADING DEVICE FOR CARTRIDGE MAGAZINES
Filed Oct. 23, 1959 3 Sheets-Sheet 1

Inventor
Rudolf Stadelmann
By
Wenderoth, Lind & Ponack
Attys.

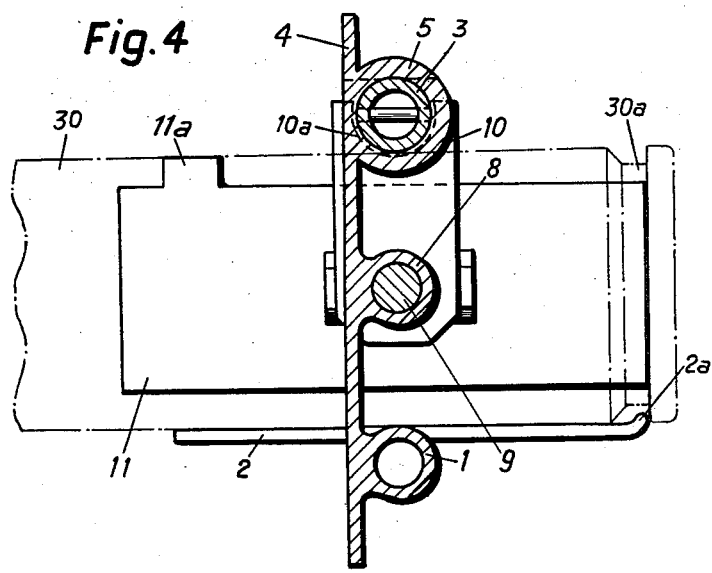
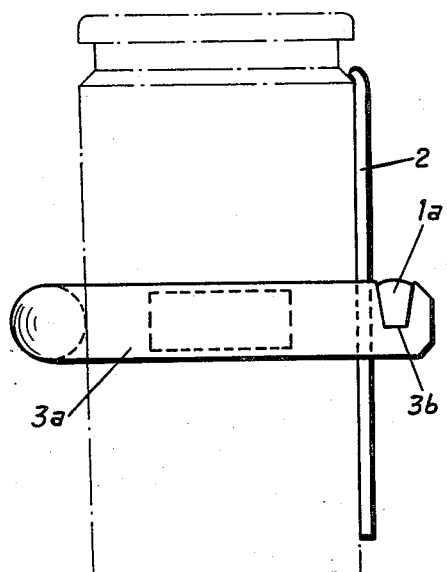

July 24, 1962  R. STADELMANN  3,045,525
LOADING AND UNLOADING DEVICE FOR CARTRIDGE MAGAZINES
Filed Oct. 23, 1959  3 Sheets-Sheet 3

Inventor
Rudolf Stadelmann
By
Wenderoth, Lind & Ponack
Attys.

United States Patent Office 3,045,525
Patented July 24, 1962

3,045,525
LOADING AND UNLOADING DEVICE FOR CARTRIDGE MAGAZINES
Rudolf Stadelmann, Zurich-Oerlikon, Switzerland, assignor to Machine Tool Works Oerlikon, Administration Company, Zurich-Oerlikon, Switzerland, a company of Switzerland
Filed Oct. 23, 1959, Ser. No. 848,366
Claims priority, application Switzerland Oct. 24, 1958
6 Claims. (Cl. 86—47)

The present invention relates to a loading and unloading device for cartridge magazines, particularly for medium caliber guns, in which the store of cartridges is subdivided into piles consisting of several cartridges lying side by side on one plane.

It is a primary object of the invention to provide a loading and unloading device of the kind referred to capable of unloading and reloading magazines, particularly for medium caliber guns, having a capacity of say more than two hundred cartridges, within a useful time after the guns have gone into action.

It is another object of the invention to provide a loading and unloading device of the kind referred to wherein no components are permanently deformed when loading as it happens in some known devices which makes their use for unloading impracticable.

It is yet another object of the invention to provide a loading and unloading device of the kind referred to in which the cartridges are positively secured against the danger of falling out, which made loading and unloading of comparatively large cartridges as those for medium caliber guns difficult and hazardous with those known devices which had merely spring loaded arms to hold the cartridges.

With these and other objects in view which will become apparent later from this specification and the accompanying drawings, I provide a loading and unloading device for cartridge magazines in which the store of cartridges is divided into piles of several cartridges lying side by side in one plane, comprising in combination: a yoke having two legs and a connecting piece connecting the said legs with one another at one end thereof, and a bridge piece mounted rotatably about an axis longitudinal of one of the said legs at the other ends thereof and capable of at least partly closing the aperture between these other ends.

Preferably this device comprises a presser plate mounted slidably parallel to the said legs on the said connecting piece, and a manually operable lever mechanism pivotally mounted on said connecting piece and operatively connected to the said presser plate, capable of moving the same longitudinally of said legs.

The said presser plate may have the shape of the segment of a tubular body the inner diameter of which corresponds to the diameter of the rear portion of the cartridge cases, and having a guide rib arranged on one of its narrow sides capable of engaging into the extractor groove of a cartridge case.

These and other features will be clearly understood from the following description of a preferred embodiment thereof given by way of example with reference to the accompanying drawings, in which:

FIG. 4 is a section on the line IV—IV of FIG. 1 on the scale of FIG. 3;

FIG. 5 is a reversed view in the direction of the arrow C of FIG. 2, on a larger scale still.

Figure 1:
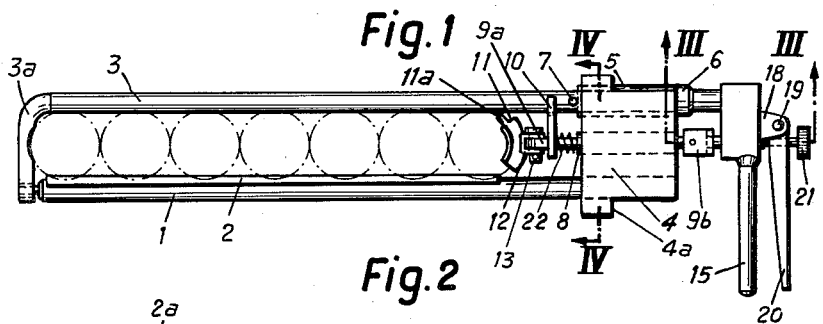
FIG. 1 is a view of the device parallel to the axes of the cartridges.
Figure 2:
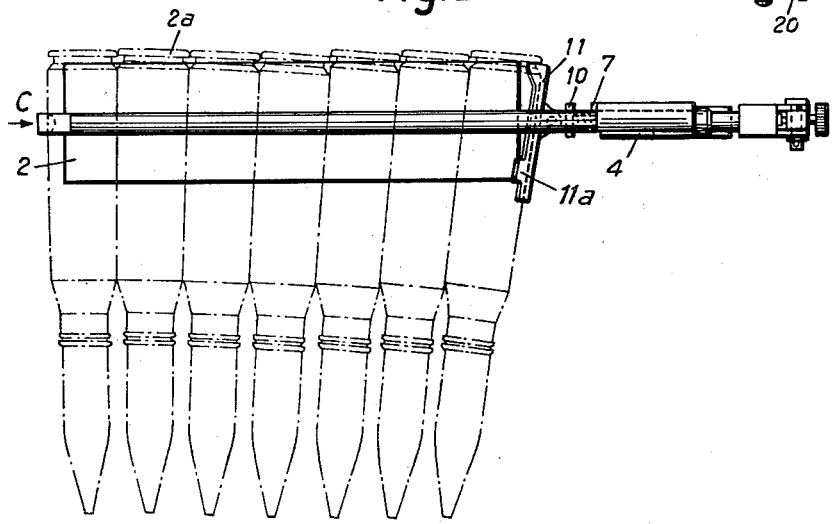
FIG. 2 is a view of the device perpendicular to the axes of the cartridges.
Figure 3:
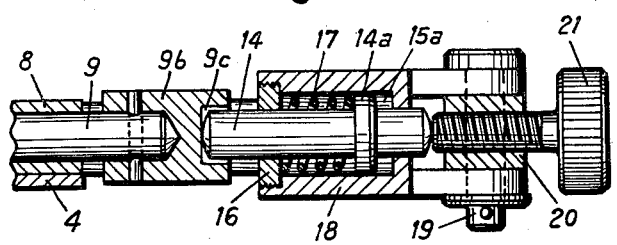
FIG. 3 is a section on the line III—III of FIG. 1 on a larger scale.

The device consists substantially of a yoke, formed by a connecting piece 4 and two legs. One leg consists of a tube 1 and a catcher tray 2 of sheet metal for the cartridges. The other leg 3 lying parallel to the leg 1, 2 consists of a tube which is rotatably mounted on the connecting piece 4 or on a guide tube 5 inserted therein (see FIG. 4). The forward end of the leg 3, which is bent at a direction more of less perpendicular to its longitudinal axis, forms as a bridge 3a for the forward closure of the said yoke, and may be provided with a groove 3b designed for being engaged by a flat extension 1a of the tube (FIG. 5). The bridge 3a may however be shorter and form a partial closure only. By a collar 6 fixed to the leg 3 which may abut one end face of the guide tube 5, and by a pin 7 projecting beyond the surface of the tube and abutting the other end face of the guide tube the position of the leg 3 in the axial position is determined.

Between and parallel to the two tubes 1 and 5 a further guide tube 8 is fixed to the connecting piece 4, wherein a pin 9 is mounted axially slidable (FIGS. 1 and 4). To this pin a forked guide piece 10 is connected, into a recess 10a of which engages the leg 3. The presser plate 11 mounted slidably relative to the connecting piece 4 is articulated to a projection 9a of said pin reaching between its lugs 12 by means of a pin 13, and is designed as a segment of a tubular body, the inner diameter of which is equal to the diameter of the rear portion of the cartridge cases, the edge profile of a narrow side of said segment corresponding to that of the extractor groove 30a of the cartridge cases 30. On the rear end of the pin a projection 9b having a transverse groove 9c is fixed. The pin 14 engaging into this groove is mounted axially slidable in the bore 15a of a hand grip 15, which is connected to the leg 3 and is directed parallel to the bridge 3a. A compression spring 17 fitted between the collar of the pin 14a and an insert piece 16 acts in the sense of a movement of the pin 14 towards the stop formed by a shoulder in the bore.

On an axle 19 fixed in lugs 18 of the hand grip 15 a lever 20 is pivotally mounted, wherein adjacent its pivot point a screw 21 is fixed. The latter is arranged co-axially to the pin 14 and capable to act with its forward end on the latter. By depressing the lever 20 by hand the presser plate 11 is shifted by means of lever action in the direction of the two legs 1, 2 and 3. When lifting the lever 20 the pin 14 is withdrawn by the spring 17 out of the groove 9c of the pin 9, and accordingly the grip 15 is released for turning the leg 3. A spring 22 loaded between the forward end of the guide tube 8 and the guide piece 10 may shift the pin 9 with the presser plate 11 until the projection 9b abuts the connecting piece 4.

Figure 6:
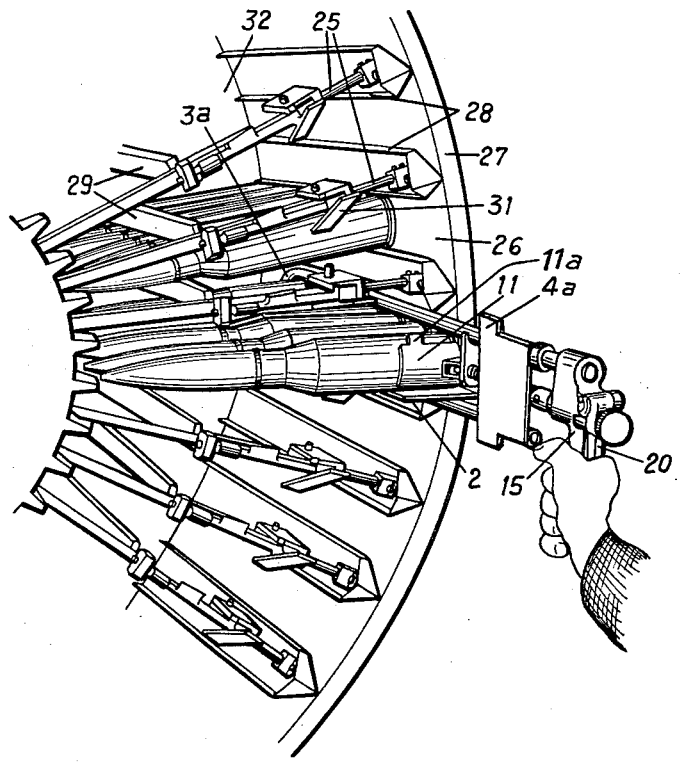
FIG. 6 is a perspective view of the cartridge magazines with a device in the operative position on a smaller scale.

In FIG. 6 part of a cartridge magazine is illustrated the contents of which may be unloaded by means of the device described hereinabove. This magazine, designed as a drum, is mounted rotatably in a manner not shown in the drawings laterally on the trunnion of the cradle of an automatic gun, and can be loaded and unloaded from the end face facing away from the weapon. Guide rails 28 and 29 are fixed parallel to the axis of rotation, on the inside 26 of the outer wall 27 of the drum as well as on spokes 25 arranged radially adjacent its end face. The piled-up cartridges pointing with the tips of their projectiles towards the axis of the drum lie side by side in a plane in the chambers bounded by these guide rails, being guided by these rails on their bottoms and on the necks of their cases. Detent pawls 31 pivotally mounted on the spokes 25 secure the cartridges on the end face of the drum against falling out. A transporting device (not shown) conveys the cartridges to the weapon during the firing from the chambers of the rotary drum through an opening of a plate 32 covering it on the back.

For unloading a chamber the bridge 3a is positioned parallel to the catcher tray 2 by turning the released grip 15, and the device is pushed into the drum in such a manner that the cartridges come to lie between the leg 3 and the catcher tray 2, and that the bend in the edge 2a of the latter engages into the extractor grooves 30a of the cartridge cases 30. Thereby the position of the cartridges in the device is determined. After the device has reached the foremost position in the drum, which is the case, when the cams 4a of the connector piece 4 abut the spokes 25, and when the cam 11a has swung the detent pawl 31 out of the locking position, the grip 15 is turned back again and thus the bridge 3a is swung behind the last cartridge of the pile, in that it turns about a longitudinal axis of the leg 3. The aforesaid longitudinal axis need not be the axis of symmetry of the leg 3. The latter may be mounted in the guide tube 5 eccentrically to its axis of symmetry in order to generate an additional clamping action on the cartridges, and may in this case show with advantage a slightly bent shape in order to compensate the flexure of the leg arising when clamping the cartridges. The leg 3 or 1, 2 may be designed alternatively as a stationary arm, in or on which a shaft carrying the bridge 3a may be pivotally mounted.

The bridge 3a when turned, is locked to the tube 1 by the engagement of the projection 1a of the tube 1a into the groove 3b.

The operator then clamps the grip 15 and the lever 20 towards one another by hand. The pressure applied to the lever 20, re-inforced by the pins 9 and 14 and the pressure plate 11, is transmitted to the pile of cartridges. Thereby the cartridges are pressed against each other and are secured against falling out of the device after a filled device is withdrawn, which fact allows a faultless withdrawal of the cartridge piles from the drum at any position.

As seen in FIGURE 6, immediately after the pawl 31 has been taken out of its locking position by the cam 11a, not only the first but all cartridges of a row of said cartridges can be unloaded, since the leading cartridge prevents the pawl 31 from returning to its locking position, because the pawl 31 rests on such cartridge until a support on the subsequent cartridge has been reached so that all cartridges of a row of said cartridges are sliding under the pawl which slightly moves up and down. The cartridges prevent the pawl from going into the locking position when the subsequent cartridges are passing.

While I have described herein and illustrated in the accompanying drawings what may be considered a typical and particularly useful embodiment of my said invention, I wish it to be understood that I do not limit myself to the particular details and dimensions described and illustrated; for obvious modifications will occur to a person skilled in the art.

What I claim as my invention and desire to secure by Letters Patent is:

1. A loading and unloading device for a cartridge magazine comprising in combination a connecting piece, two spaced parallel legs extending from one side of said connecting piece to form with the latter a yoke wherein said legs form a passage for cartridges and said yoke embraces a row of cartridges lying side by side in a plane, a bridge on the projecting end of one of said legs and means to pivot said bridge in a plane normal to said legs from a first position in which said bridge lies substantially parallel to said cartridges to keep said passage for said cartridges open to a second position in which said bridge lies across said passage to keep said passage closed and said means for pivoting said bridge are mounted on the other side of said connecting piece from said legs.

2. A cartridge magazine with a loading and unloading device comprising in combination, a magazine wherein a supply of cartridges is sub-divided into rows of cartridges lying side by side in a plane so that a single row of said rows of cartridges can be loaded or unloaded from said magazine, a connecting piece, two spaced substantially parallel legs extending from one side of said connecting piece to embrace a row of cartridges, said legs forming a passage for said row of cartridges, one of said legs being pivotably mounted on said connecting piece to pivot about its own axis relative to said connecting piece with its end projecting at one side of said connecting piece bent in a direction normal to said leg to form a bridge and a hand grip secured on the other end of said leg from said bridge whereby said legs can be inserted between rows of cartridges into said magazine and said bridge can be pivoted from an open passage position to a closed passage position.

3. A cartridge magazine with a loading and unloading device as set forth in claim 2 wherein said magazine has an end face and spokes arranged adjacent said end face, said connecting piece having a cam to abut one of said spokes for limiting the movement of said legs into said magazine.

4. A loading and unloading device for a cartridge magazine comprising in combination a connecting piece, two spaced parallel legs extending from one side of said connecting piece to form with the latter a yoke wherein said legs form a passage for cartridges and said yoke embraces a row of cartridges lying side by side in a plane, a bridge on the projecting end of one of said legs and means to pivot said bridge in a plane normal to said legs from a first position in which said bridge lies substantially parallel to said cartridges to keep said passage for said cartridges open to a second position in which said bridge lies across said passage to keep said passage closed and said means for pivoting said bridge comprising a hand grip secured to the leg having said bridge at the other end thereof to pivot said leg and bridge to open and close said passage.

5. A loading and unloading device as set forth in claim 4 comprising a lever mounted pivotally on said hand grip, a presser plate mounted slidably in said connecting piece to engage a row of cartridges embraced by said legs, a first pin mounted slidably in said connecting piece connected to said presser plate and a second pin slidably mounted on said hand grip operatively connected to said lever, said second pin cooperating with said first pin when said leg with said depressed hand grip lies in closed passage position in order that said row of cartridges embraced by said legs may be pressed by said lever, said second pin, said first pin, and said presser plate against said bridge.

6. A cartridge magazine with a loading and unloading device comprising in combination, a magazine wherein a supply of cartridges is sub-divided into rows of cartridges lying side by side in a plane so that a single row of said rows of cartridges can be loaded or unloaded from said magazine, a connecting piece, two spaced substantially parallel legs extending from one side of said connecting piece to embrace a row of cartridges, said legs forming a passage for said row of cartridges, one of said legs being pivotably mounted on said connecting piece to pivot about its own axis relative to said connecting piece bent in a direction normal to said leg to form a bridge, a hand grip secured on the other end of said leg from said bridge whereby said legs can be inserted between rows of cartridges into said magazine and said bridge can be pivoted from an open passage position to a closed passage position, said magazine having an end face, spokes arranged adjacent said end face, said connecting piece having a cam to abut one of said spokes for limiting the movement of said legs into said magazine, a lever mounted pivotally on said hand grip, a presser plate including a first pin is mounted slidably in said connecting piece to engage said row of cartridges embraced by said legs, said first pin projecting beyond the other side of said connecting piece, a second pin slidably mounted on said hand grip operatively connected to said lever, said second pin engaging said first pin when said leg with said hand grip is in said closed passage position in order that said row of cartridges embraced by said legs may be pressed by said lever, said second pin, said first pin and said presser plate against said bridge, detent pawls pivotally mounted on said spokes to secure said rows of cartridges in said magazine on said end face of said magazine against falling out and a second cam provided on said presser plate to release one of said detent pawls.

References Cited in the file of this patent

UNITED STATES PATENTS

| | | |
|---|---|---|
| 2,359,842 | Haberstump | Oct. 10, 1944 |
| 2,403,012 | McPheters | July 2, 1946 |
| 2,462,836 | Barker et al. | Mar. 1, 1949 |
| 2,493,048 | Wangrow | Jan. 3, 1950 |

FOREIGN PATENTS

| | | |
|---|---|---|
| 555,099 | Great Britain | Aug. 4, 1943 |